Patented Jan. 27, 1942

2,271,122

UNITED STATES PATENT OFFICE 2,271,122

PROCESS OF VULCANIZING RUBBER

Marion W. Harman, Nitro, W. Va., assignor to Monsanto Chemical Company, St. Louis, Mo., a corporation of Delaware No Drawing. Application December 27, 1938, Serial No. 247,951

8 Claims. (Cl. 260—784)

The present invention relates to a new class of rubber vulcanization accelerators and to the vulcanization of rubber by an improved process wherein there is employed a preferred class of compounds in the vulcanization process.

The new class of compounds have been found to accelerate the vulcanization of rubber and in consequence may be employed alone as accelerators of the vulcanization of rubber. In the preferred operation of the present invention, however, the new accelerators are employed in conjunction with other organic accelerators whereby rubber products exhibiting improved properties are obtained.

The new and preferred class of accelerators are heterocyclic imido methylene amines containing the grouping

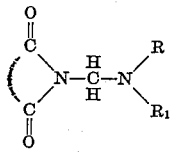

where R and $R_1$ are chosen from a group consisting of hydrogen, alkyl, aralkyl and alicyclic radicals and the two C=O groups are attached to different carbon atoms, which by direct linkage to each other or through intervening carbon atoms, complete the heterocyclic structure. For example, in the simplest case the C=O groups are attached to adjoining carbon atoms whose other valences are satisfied by hydrogen or hydrocarbon groups. Such a structure may be represented as follows

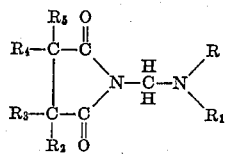

where $R_2$, $R_3$, $R_4$ and $R_5$ represent hydrogen or hydrocarbon groups and R and $R_1$ have the significance given above. Where a double bond links the adjoining carbon atoms the structure becomes

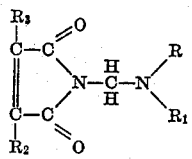

in which case $R_2$ and $R_3$ represent hydrogen or hydrocarbon groups which may be joined to form a carbocyclic ring as for example a benzene ring and R and $R_1$ have the same significance above.

As a further variation of the structure of the compounds of the present invention the C=O groups may be linked to different carbon atoms which complete a cyclic structure through intervening carbon atoms and again part of the said cyclic structure may serve as part of a second carbocyclic ring as exemplified by the following example

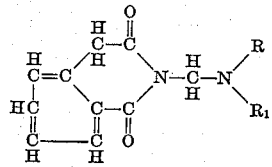

where R and $R_1$ have the same significance as before.

The compounds of the present invention may be prepared by a method described by Sachs in the Berichte der Deutschen Chemischen Gesellschaft, volume 31, pages 3232 and 3235 (1898) according to which an imide is preliminarily reacted with formaldehyde to produce an imido oxy methylene compound which is converted to the corresponding halide and further treated with an amine. Other methods of preparation will suggest themselves to those skilled in the art and where convenient or desirable other methods may be employed. For example, an imido oxy methylene compound may be reacted with an amine in which case water is removed from the reaction as a by-product in place of the hydrogen halide split off when employing the method of Sachs. The imido oxy methylenes utilized in the reactions are as a rule readily prepared by the action of formaldehyde on an imide. It is to be understood, however, that this invention does not relate to the preparation of the preferred materials and is in nowise limited thereto.

As a specific example of a typical preparation of one of the preferred materials the following reaction was carried out

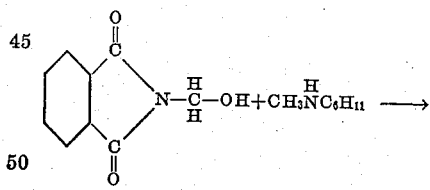

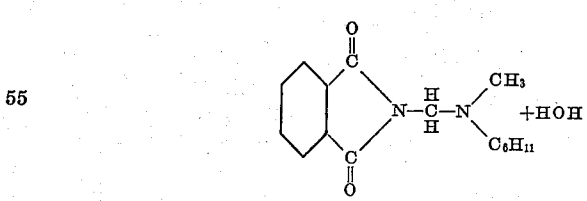

Phthalimido methylene methyl cyclohexylamine 35.4 parts by weight (substantially 0.2 molecular proportion) of hydroxy methyl phthalimid and 22.6 parts by weight (substantially 0.2 molecular proportion) of methyl cyclohexylamine were placed in a suitable container and heated at 140–145°. The reaction proceeded smoothly with the separation of water and was substantially complete within an hour after which the reaction mass was allowed to cool and any traces of water remaining were removed by any convenient method, for example by filtering through absorbent paper. The product was obtained as a yellow syrup.

As a further specific example 35.4 parts by weight (substantially 0.2 molecular proportion) of hydroxy methyl phthalimid and 33.8 parts by weight (substantially 0.2 molecular proportion) of o-amino biphenyl were placed in a suitable reactor fitted with a reflux condenser and heated for one hour at substantially 140–145° C. A yellow solid separated which after grinding and subsequently drying at substantially 70° C., gave a melting point of 187–189° C. This product, which was obtained in nearly theoretical yield, and believed to be phthalimido methylene o-biphenyl amine,

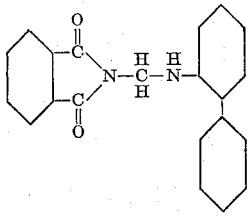

was incorporated in a rubber stock and employed with good effect in accordance with the principles of the present invention.

Other and further examples of the preferred materials were prepared and found to exhibit the desirable properties typical of the class. Thus, the reaction of hydroxy methyl phthalimid and aniline was carried out substantially as described in the above examples to obtain the product

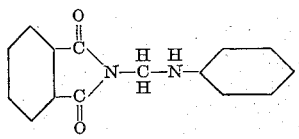

phthalimido methylene aniline described by Sachs in the article referred to above. Similarly phthalimido methylene diamyl amine was obtained as a yellow syrup and phthalimido methylene diphenyl guanidine was obtained as an amber colored brittle resin from the reaction of hydroxy methyl phthalimid and diphenyl guanidine carried out substantially as described above. Obviously other methods and other means of effecting the desired reactions may be employed where convenient or desirable. Thus, a suitable organic solvent may be utilized as a reaction medium or other innovations introduced.

The present invention is not limited to the members of the preferred class of compounds specifically mentioned but relates broadly to the compounds containing the structure set forth above. Products further illustrating the preferred class of materials are succinimido methylene p-biphenyl amine, maleinimido methylene cyclohexylamine, methyl ethyl maleinimido methylene diphenyl amine, glutaconimido methylene methyl phenyl amine, glutarimido methylene di- cyclohexylamine, o-homo phthalimido methylene benzyl amine, phthalimido methylene amyl amine, phthalimido methylene dibutyl amine, chlorphthalimido methylene ethyl cyclohexylamine, methyl propyl maleinimido methylene di-o-tolyl guanidine, and succinimido methylene o-biphenyl amine.

As a specific embodiment of the invention showing the use of the new class of materials as accelerators for the vulcanization of rubber but which is intended to illustrate and not to limit the invention, a rubber stock was compounded comprising:

|  | Stock | |
| --- | --- | --- |
|  | A | B |
|  | Parts by weight | Parts by weight |
| Pale crepe rubber | 100 | 100 |
| Zinc oxide | 10 | 10 |
| Sulfur | 3 | 3 |
| Stearic acid | 0.5 | 0.5 |
| Phthalimido methylene methyl cyclohexylamine | 1.0 | 1.5 |

The rubber stocks so compounded were vulcanized in a press at the temperature of twenty pounds steam pressure per square inch and the following modulus and tensile properties were obtained on testing the cured rubber product.

Table I

| Stock | Cure, time in minutes | Modulus of elasticity in lbs./in.$^2$ at elongations of— | | Tensile at break in lbs./in.$^2$ | Ult. elong., percent |
| --- | --- | --- | --- | --- | --- |
|  |  | 500% | 700% |  |  |
| A | 60 | 60 | 150 | 785 | 1,040 |
| B | 60 | 45 | 190 | 885 | 1,010 |
| A | 90 | 125 | 350 | 1,090 | 920 |
| B | 90 | 155 | 480 | 1,325 | 807 |

The above data show the accelerating properties of the preferred class of compounds. It is preferred, however, to employ them in conjunction with organic accelerators of a different class whereby new and improved results in the vulcanization of rubber are obtained. For example the new compounds show a desirable activation of organic accelerators of a different type when employed in conjunction therewith producing vulcanized rubber products of improved physical properties. In the preferred operation of the present invention the preferred class of compounds may be employed with any of the usual accelerators commonly employed in the vulcanization of rubber. For example, the mercapto thiazole accelerators such as mercapto benzo thiazole, mercapto phenyl benzothiazole, mercapto naphtha thiazole, mercapto methyl thiazole and mercapto methyl benzothiazole may be employed with the new accelerators of the present invention. It is meant to include by the term "mercapto thiazole" accelerators reaction products of mercapto thiazoles as well as the free mercapto thiazoles. Accordingly the organic base reaction products of mercapto thiazoles exemplified by di(benzothiazyl thiol) dimethyl urea and cyclohexylamino thiol benzothiazole may be employed in conjunction with the compounds of the present invention. Other reaction products of mercapto thiazoles have likewise been found applicable as for example, dinitro phenyl benzothiazyl sulfide, benzothiazyl thiol benzoate and methylol thiol benzothiazole and the thiazole sulfides such as dibenzothiazyl mono sulfide and dibenzothiazyl disulfide. In addition other types of accelerators than the mercapto thiazoles may be employed such as dithio carbamates, thiuram sulfides and the aldehyde-amine accelerators, specific examples of which are sodium dimethyl dithiocarbamate, dimethyl thiuram sulfide, piperidine cyclopentamethylene dithio carbamate, butylaldehyde aniline, acetaldehyde aniline, formaldehyde aniline and acetaldehyde ethylidene aniline.

The following are examples of the preferred operation of the present invention showing the use of the preferred compounds in conjunction with other accelerators and are to be understood as specific embodiments of the invention and in nowise limitative.

Rubber stocks were compounded comprising

| | Stock | | | |
|---|---|---|---|---|
| | C | D | E | F |
| | Parts by weight | Parts by weight | Parts by weight | Parts by weight |
| Smoked sheets of rubber | 100 | 100 | 100 | 100 |
| Zinc oxide | 10 | 10 | 10 | 10 |
| Sulfur | 3 | 3 | 3 | 3 |
| Stearic acid | 0.5 | 0.5 | 0.5 | 0.5 |
| Mercapto benzothiazole | 0.6 | 0.6 | | |
| Phthalimido methylene methyl cyclohexylamine | | 0.1 | | 0.5 |
| Aliphatic aldehyde-aniline condensation product | | | 0.5 | 0.5 |

The rubber stocks so compounded were vulcanized by heating in a press at the temperature of thirty pounds steam pressure per square inch and the modulus and tensile properties obtained on testing the cured rubber stocks are given in Table II.

*Table II*

| Stock | Cure, time in minutes | Modulus of elasticity in lbs./in.² at elongations of— | | Tensile at break in lbs./in.² | Ult. elong., percent |
|---|---|---|---|---|---|
| | | 500% | 700% | | |
| C | 30 | 350 | 1,380 | 2,700 | 820 |
| D | 30 | 755 | 3,150 | 3,790 | 745 |
| C | 45 | 440 | 1,740 | 2,920 | 805 |
| D | 45 | 850 | 3,300 | 3,700 | 725 |
| C | 60 | 445 | 1,835 | 2,830 | 790 |
| D | 60 | 800 | 3,320 | 3,760 | 730 |
| C | 90 | 440 | 1,740 | 3,025 | 810 |
| D | 90 | 760 | 2,980 | 3,715 | 780 |
| E | 30 | 390 | 1,650 | 3,050 | 855 |
| F | 30 | 440 | 2,020 | 3,420 | 810 |
| E | 45 | 315 | 2,380 | 3,945 | 805 |
| F | 45 | 675 | 2,680 | 4,270 | 810 |
| E | 60 | 600 | 2,550 | 3,970 | 800 |
| F | 60 | 845 | 3,430 | 4,150 | 760 |
| E | 90 | 735 | 2,940 | 4,000 | 770 |
| F | 90 | 1,030 | 4,100 | 4,300 | 715 |

The above data show that the preferred class of materials are powerful activators of mercapto thiazole accelerators as for example mercapto benzothiazole. The above data further show that the preferred class of of materials exhibit marked activating properties for aldehyde-amine accelerators.

As further specific embodiments of the present invention showing the use of the preferred class of materials with organic base reaction products comprising

| | Stock | |
|---|---|---|
| | G | H |
| | Parts by weight | Parts by weight |
| Pale crepe rubber | 100 | 100 |
| Whiting | 60 | 60 |
| Zinc oxide | 5 | 5 |
| Sulfur | 2 | 2 |
| Laurex | 0.25 | 0.25 |
| Cyclohexylamino thiol benzothiazole | 0.60 | 0.60 |
| Di(benzothiazyl thiol)dimethyl urea | 0.30 | 0.30 |
| Phthalimido methylene methyl cyclohexylamine | 0.30 | |
| Phthalimido methylene diamylamine | | 0.30 |

The rubber stocks so compounded were vulcanized by heating for different periods of time in a press at the temperature of twenty pounds steam pressure per square inch and the modulus and tensile properties obtained on testing the cured rubber products are shown in Table III.

*Table III*

| Stock | Cure, time in minutes | Modulus of elasticity in lbs./in.² at elongations of— | | Tensile at break in lbs./in.² | Ult. elong., percent |
|---|---|---|---|---|---|
| | | 300% | 500% | | |
| G | 30 | 395 | 1,530 | 3,525 | 670 |
| H | 30 | 385 | 1,450 | 3,400 | 670 |
| G | 45 | 435 | 1,670 | 3,550 | 655 |
| H | 45 | 425 | 1,620 | 3,540 | 655 |
| G | 60 | 440 | 1,675 | 3,440 | 640 |
| H | 60 | 420 | 1,630 | 3,530 | 650 |

The above data show the use of the preferred class of materials with organic base reaction products of mercapto thiazoles and the desirable modulus and tensile properties obtained thereby. In addition to the above it was found that the preferred class of compounds are particularly applicable as activators in dry heat cures. Thus, the above stocks (stocks G and H) were also cured in dry heat by heating for 60 and 75 minutes respectively at 260° F. Neutral colored cured stocks were produced which were found on testing to possess desirable modulus and tensile properties in conformity with the desirable results obtained from press cures as set forth in Table III. Thus in addition to giving satisfactory activation the preferred class of compounds are resistant to discoloration, a property which greatly extends their usefulness. For example, they may be incorporated into white rubber products where many materials otherwise desirable are not suitable because they discolor the cured rubber products.

As further specific embodiments of the invention rubber stocks were compounded comprising

| | Stock | |
|---|---|---|
| | J | K |
| | Parts by weight | Parts by weight |
| Pale crepe rubber | 100 | 100 |
| Zinc oxide | 10 | 10 |
| Sulfur | 3 | 3 |
| Stearic acid | 0.5 | 0.5 |
| Di(benzothiazyl thiol) dimethyl urea | 0.6 | 0.6 |
| Phthalimido methylene diphenyl guanidine | 0.3 | |
| Phthalimido methylene aniline | | 0.3 |

The rubber stocks so compounded were vulcanized in a press at the temperature of twenty pounds steam pressure per square inch and the physical properties of the cured rubber products are set forth in Table IV.

*Table IV*

| Stock | Cure, time in minutes | Modulus of elasticity in lbs./in.² at elongations of— | | Tensile at break in lbs./in.² | Ult. elong., percent |
|---|---|---|---|---|---|
| | | 500% | 700% | | |
| J | 30 | 495 | 2,440 | 3,220 | 770 |
| K | 30 | 175 | 440 | 1,810 | 930 |
| J | 45 | 760 | 3,030 | 4,000 | 750 |
| K | 45 | 210 | 990 | 2,460 | 880 |
| J | 60 | 885 | 3,450 | 4,250 | 745 |
| K | 60 | 325 | 1,400 | 2,630 | 825 |
| J | 90 | 1,030 | 3,885 | 4,280 | 720 |
| K | 90 | 440 | 1,900 | 3,160 | 795 |

The above data show the desirable modulus and tensile properties obtained by the use of the preferred class of materials in conjunction with an organic base reaction product of a mercapto thiazole.

The preferred class of materials may be employed with other accelerators than those specifically mentioned for this invention is not restricted to the use of the particular compounds given in the disclosure as examples nor is it restricted to the use of the preferred class of compounds in the particular rubber mixes herein described. Other ratios of the compounding ingredients than those mentioned in the examples hereinbefore set forth, as well as other well known fillers, pigments and the like may be employed in the production of various types of rubber compounds as are apparent to those skilled in the art to which the invention pertains. The invention is limited solely by the following claims.

What is claimed is:

1. The process of vulcanizing rubber which comprises heating rubber and sulfur in the presence of an amino methylene imide of an organic dicarboxylic acid containing at least four carbon atoms, the said amino substituent being the residue remaining after the removal of one hydrogen atom from a member of a group consisting of guanidines, ammonia and mono and disubstituted ammonias wherein the substituents are selected from a group consisting of alkyl, aryl, aralkyl and alicyclic radicals.

2. The process of vulcanizing rubber which comprises heating rubber and sulfur in the presence of a compound possessing the structure

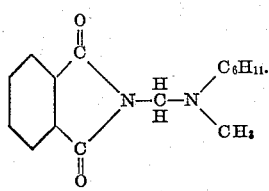

3. The process of vulcanizing rubber which comprises heating rubber and sulfur in the presence of a compound possessing the structure

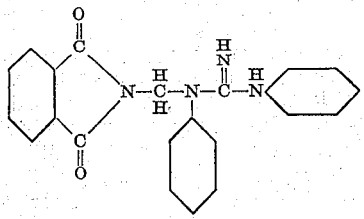

4. The process of vulcanizing rubber which comprises heating rubber and sulfur in the presence of a compound possessing the structure

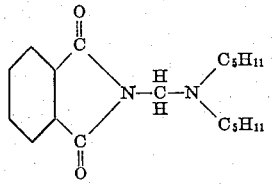

5. The vulcanized rubber product obtained by heating rubber and sulfur in the presence of an amino methylene imide of an organic discarboxylic acid containing at least four carbon atoms the said amino substituent being the residue remaining after the removal of one hydrogen atom from a member of a group consisting of guanidines, ammonia and mono and disubstituted ammonias wherein the substituents are selected from a group consisting of alkyl, aryl, aralkyl and alicyclic radicals.

6. The vulcanized rubber product obtained by heating rubber and sulfur in the presence of a compound possessing the structure

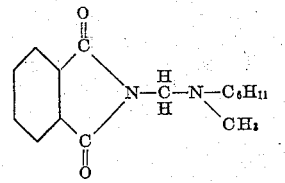

7. The vulcanized rubber product obtained by heating rubber and sulfur in the presence of a compound possessing the structure

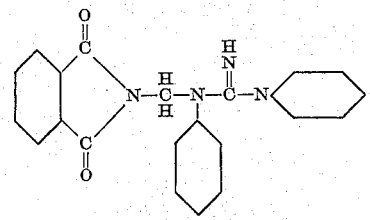

8. The vulcanized rubber product obtained by heating rubber and sulfur in the presence of a compound possessing the structure

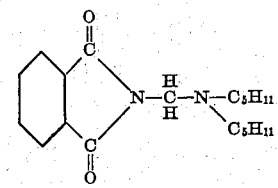

MARION W. HARMAN.

CERTIFICATE OF CORRECTION.

Patent No. 2,271,122.   January 27, 1942.

MARION W. HARMAN.

It is hereby certified that error appears in the printed specification of the above numbered patent requiring correction as follows: Page 1, first column, line 26, after "alkyl," insert --aryl,--; and that the said Letters Patent should be read with this correction therein that the same may conform to the record of the case in the Patent Office.

Signed and sealed this 10th day of March, A. D. 1942.

Henry Van Arsdale,
Acting Commissioner of Patents.

(Seal)